Patented Sept. 14, 1954

2,689,204

UNITED STATES PATENT OFFICE 2,689,204

CULTURE MEDIUM CONTAINING BISMUTHYL POLYHYDROXY POLYSULFITE

Walter J. Nickerson, Princeton, N. J.

No Drawing. Application October 1, 1952,
Serial No. 312,661

11 Claims. (Cl. 195—100)

This invention relates to a culture medium for the isolation and differentiation of species in general, and pathogenic species in particular, of the genus Candida, a genus of yeasts, and more particularly relates to a medium containing a bismuthyl hydroxy sulfite that yeast organisms of the genus Candida are able to reduce to bismuth sulfide.

The differentiation of species of yeasts and species of the genus Candida in particular has been accomplished only with great difficulty and by highly trained investigators for identification of yeast species has been based on observations of morphology, fermentation of sugars, and pathogenicity for rabbits and these properties are not always consistent even with the same species of yeast.

The production of hydrogen sulfide by yeasts from the reduction of sulfur, thiosulfate or sulfite has been studied by several investigators. It was reported very early that yeasts vary in their ability to reduce sulfite with the formation of hydrogen sulfide. The use of a bismuth-sulfite medium for the recognition and observation of the sulfite reducing ability of bacteria was introduced by Wilson and Blair, J. Path. and Bact., 29, 310–31 (1926); Jour. Hygiene, 26, 374–391 (1927) and Jour. Hygiene, 31, 138–161 (1931), and extensively studied by Hunter and Crecelius, J. Bact., 35, 185–196 (1938). The Wilson and Blair medium has been widely used for the differentiation of species of Salmonella or Shiegella from the coliform group and for the isolation of enteric pathogenic organisms. Although the medium of Wilson and Blair is satisfactory for the differentiation of bacteria, it is not suitable for the differentiation of yeasts and particularly for the differentiation of the species of the genus Candida.

An object of this invention is the provision of a culture medium on which species of the genus Candida will grow with such distinctive characteristics that the species can be isolated and differentiated.

It is another object of this invention to provide a culture medium on which pathogenic species of the genus Candida will grow with such distinctive characteristics that each may be readily and positively identified.

It is another and further object of this invention to provide a culture medium containing bismuthyl hydroxy sulfite on which colonies of the species of the genus Candida can be isolated and differentiated because of the characteristic shapes and colors of the colonies.

It is still another object of this invention to provide a culture medium containing bismuthyl hydroxy sulfite on which the species of the genus Candida can be isolated and differentiated from other yeast genera.

It has now been discovered that species of the genus Candida will grow on a medium containing a bismuthyl hydroxy sulfite, ingredients essential to the growth of yeasts and a solidifying agent, and that, species of the genus Candida, and particularly of the species of the genus Candida that have been isolated from clinical material, when grown on the medium of this invention, have a consistent color and appearance with respect to colony shape, size and curvature, as well as mycelial growth and the like, sufficiently characteristic and distinctive from each other and species of other yeast genera that their differentiation and identification may be quickly made by macroscopic examination of these properties alone.

The mechanism by which a yeast is able to produce bismuth sulfide by reduction of bismuthyl hydroxy sulfite is not completely understood but it is believed that an enzyme produced by the yeast organism catalyzes reduction of the sulfite portion of the bismuthyl hydroxy sulfite present within the cell and that, simultaneous with reduction, the reduction product combines with the bismuth of the bismuthyl hydroxy sulfite in a substantially irreversible manner to produce bismuth sulfide. The enzymatic reduction taking place within the cells of the yeast organism occurs only over a range of reducing potential of −150 to −250 millivolts. Not all yeasts are capable of producing bismuth sulfide in the presence of bismuthyl hydroxy sulfite but the species of the genus Candida are capable to varying degrees of accomplishing this and it is because of this metabolic difference that the cells and colonies of cells of the genus Candida are colored differently ranging from light brown, through reddish brown, dark brown, and black to jet black.

The bismuthyl hydroxy sulfite must be present in the medium in such a form that, upon inoculation of the medium, it is taken from the medium by and is present in the yeast cells so that bismuth sulfide is produced within the cells by its reduction. In order that the yeast cells are able to produce bismuth sulfide, the bismuthyl hydroxy sulfite must also be present in such a form that the reduction potential within the cells is within the range of −150 to −250 millivolts. If bismuth, chemically combined with sulfite, is not present within the cells, reduction of sulfite to sulfide does not occur probably because, in the absence of bismuth, the metabolically generated reducing capacity of the cell is insufficient to establish a potential within the range requisite for sulfite reduction. Only bismuthyl polyhydroxy sulfites made by the reaction of a bismuth salt such as the nitrate and sodium sulfite in whole number molecular ratios of one to three through one to six have been found satisfactory for inclusion in a medium for the isolation and identification of species of the genus Candida.

Bismuthyl heptahydroxy decasulfide, having a probable formula:

and bismuthyl trihydroxy pentasulfide, having the probable formula:

in which the ratios of bismuth nitrate to sodium sulfite used in their preparation are one to three and one to four and the ratios of bismuth atoms to sulfur atoms in the compounds are 13 to 10 and seven to five respectively, are described and a method of preparation given by Mellor, "A Comprehensive Treatise of Inorganic and Theoretical Chemistry," vol. X, published by Longmans, Green & Co., London, England.

Bismuthyl heptahydroxy decasulfide was prepared by adding 0.05 mol of Bi(NO₃)₃·5H₂O in 100 ml. of ten per cent nitric acid to 0.15 mol of sodium sulfite in 275 ml. of distilled water at room temperature. The solution was stirred and a dense white precipitate was formed. The precipitate was removed at once by centrifugation, and washed at room temperature with several portions of water. The moist precipitate was only slightly acid.

Bismuthyl trihydroxy pentasulfide was prepared by adding 0.05 mol of Bi(NO₃)₃·5H₂O in 100 ml. of ten per cent nitric acid to 0.20 mol of sodium sulfite in 275 ml. of distilled water at room temperature. The solution was stirred and a white precipitate was formed. The precipitate was removed at once by centrifugation, and washed at room temperature with several portions of water. The moist precipitate was only slightly acid.

Bismuthyl hydroxy sulfites, such as bismuthyl hydroxy decasulfite, bismuthyl hydroxy pentasulfite, bismuthyl dihydroxy trisulfite, and bismuthyl trihydroxy tetrasulfite are also described by Mellor but are not satisfactory for use in the medium of this invention for they are either not reduced by the species of the genus Candida or the colonies grown on media containing them have no distinctive and characteristic colors.

The general procedures given by Mellor, at the place cited above, are followed in the preparation of two new and additional bismuthyl polyhydroxy sulfites except that the molecular ratios of bismuth nitrate and sodium sulfite are one to five and one to six and the ratios of bismuth atoms to sulfur atoms are 15 to 10 and eight to five respectively.

The bismuthyl polyhydroxy polysulfite having a ratio of bismuth atoms to sulfur atoms of eight to five was prepared by adding a solution of 24.25 grams bismuth nitrate Bi(NO₃)₃·5H₂O in 100 ml. of ten per cent nitric acid to a solution of 37.8 grams of anhydrous sodium sulfite in 275 ml. of distilled water. The product was precipitated at once, removed by filtration, washed and dried. The product dried as a creamy powder which may be readily dispersed in water or agar.

The bismuthyl polyhydroxy polysulfite having a ratio of bismuth atoms to sulfur atoms of fifteen to ten was prepared by adding a solution of 24.25 grams of bismuth nitrate (Bi(NO₃)₃·5H₂O) in 100 ml. of ten per cent nitric acid to a solution of 31.5 grams of anhydrous sodium sulfite in 275 ml. of distilled water. The product was precipitated at once, removed by filtration, washed and dried. The product was made into a paste with a small amount of water and was then readily dispersed in agar.

The medium contains a source of nitrogen which may be an inorganic ammonium salt such as ammonium sulfate but it is preferred that the source of nitrogen be an organic compound such as a low molecular weight amino acid and of the low molecular weight amino acids, glycine is preferred. Ammonium nitrogen, in the presence of a substantial amount of inorganic phosphate, promotes diffusion of the reducing enzyme of the yeast organisms into the medium. A source of energy is provided by inclusion in the medium of a sugar such as dextrose or fructose or the salt of an organic acid such as sodium pyruvate. The medium contains a source of phosphorous which is primarily in the form of organic phosphate and this is conveniently provided by yeast extract.

It is preferred that the source of phosphorous be predominantly organic phosphate because this is slowly attacked by yeast organisms and supplies phosphorous without liberation of phosphate ions into the medium. The amount of inorganic phosphate in yeast extract is not sufficient to cause troublesome diffusion even if the source of nitrogen is ammonium nitrogen. If there is a substantial amount of phosphate compound present from which phosphate ion is readily produced and liberated into the medium, the enzyme produced within the yeast cells diffuses out of the cells into the surrounding medium, bismuth sulfide is produced in the medium around the cells, and the medium becomes colored. Identification of the various species of the genus Candida cannot be made at all under these conditions or only with difficulty and with a low degree of accuracy. A mono or diphosphate of a hexose such as glucose is also a satisfactory source of organic phosphate for inclusion in the medium. Customary sources of vitamins such as biotin and minerals such as magnesium, iron, and potassium and the trace metals must also be present in the medium and are conveniently supplied by the yeast extract, but if yeast extract is not an ingredient, they may be supplied in other forms or even individually.

The medium contains a solidifying agent such as agar or a neutral cellulose derivative such as methyl or ethyl cellulose. Any gelling material is suitable for use which does not interfere with the growth of yeast organisms.

A medium containing the above ingredients does not support the growth of bacteria but supports a vigorous growth of yeasts in general and of species of the genus Candida in particular.

The following examples, in which the amounts are by weight, represent a medium on which yeast organisms will grow but which will not support the growth of bacteria and on which the species of the genus Candida, and the pathogenic species of the genus Candida in particular, may be isolated and identified. It is understood that these examples are given solely for the purpose of illustration and not with the idea of limiting the scope of the application which is limited only by the scope of the appended claims.

Example I

| | |
|---|---|
| Dextrose | 10 |
| Bismuthyl heptahydroxy decasulfite | 8 |
| Agar | 20 |
| Glycine | 10 |
| Yeast Extract | 1 |
| Distilled water | 1000 |

Example II

| | |
|---|---|
| Fructose | 10 |
| Bismuthyl trihydroxy pentasulfite | 8 |
| Agar | 20 |
| Alanine | 10 |
| Yeast Extract | 1 |
| Distilled water | 1000 |

Example III

| | |
|---|---|
| Dextrose | 8 |
| Bismuthyl polyhydroxy polysulfite having a ratio of bismuth atoms to sulfur atoms of fifteen to ten | 6 |
| Agar | 20 |
| Glycine | 10 |
| Yeast Extract | 1 |
| Distilled water | 1000 |

Example IV

| | |
|---|---|
| Dextrose | 8 |
| Bismuthyl polyhydroxy polysulfite having a ratio of bismuth atoms to sulfur atoms of eight to five | 6 |
| Agar | 20 |
| Glycine | 10 |
| Yeast Extract | 1 |
| Distilled water | 1000 |

The media of the examples were prepared by adding the moist bismuthyl polyhydroxy polysulfite to a molten mass containing the other ingredients. The mixture was shaken until homogeneous and the suspension was poured into plates or tubes as desired and allowed to cool. The pH of the media of Examples I, III, and IV, is 6.5, and the pH of Example II is 6.8. It has been found necessary for the pH of the media to be substantially within the range of 6 to 7.

Identifying characteristics of colonies of the eight species of the genus Candida that have been isolated from clinical material, are given below. The characteristics are for colonies grown on the media of Examples I and II for 48–72 hours at 28° C.

*Candida albicans* colonies were circular, medium size, smooth on top, hemispherical and jet black. There was some filamentation.

*Candida tropicalis* colonies were medium size and dark brown with a jet black central prominence. The area immediately around the colonies was darkened by the presence of bismuth sulfide and this probably resulted from the diffusion of the reducing enzyme from the cell into the surrounding medium. This is the only organism showing diffusion on this medium. There was no filamentation.

*Candida krusei* colonies were large, flattened, wrinkled and had a silvery black crown with gradually changing color outwardly to a brown periphery. There was an extensive yellow mycelial halo.

*Candida parakrusei* colonies were of medium size, flattened, frequently wrinkled and were a glistening dark reddish brown in the center with the color progressively lighter to the periphery which was light reddish brown. There was an extensive yellowish mycelial fringe.

*Candida pseudotropicalis* colonies were large, flat, and a glistening dark reddish brown. There was a slight mycelial fringe.

*Candida stellatoides* colonies were of medium size, flattened and a very dark brown. There was almost no mycelial development.

*Candida guilliermondia* colonies were small, flat and dark brown with a metallic sheen. There was almost no mycelial development.

*Candida mortifera* colonies were small, flattened and gray brown. There was a slight mycelial fringe.

The colors of colonies of species of the genus Candida, other than those isolated from clinical material, and species of other yeast genera are given below. The colonies were grown on the medium of Example I for 48–72 hours at 28° C.

The following were yellow brown to light brown after 48 hours:

Brettanomyces clausseni
    Debaryomyces klockeri
    Sporobolomyces salmonicolor
    Zygosaccharomyces priorianus
    Brettanomyces bruxellensis
    Candida lypolytica The following were colorless after 48 hours or did not grow on the medium of Example I:

Candida pelliculosa
    Cryptococcus neoformans
    Debaryomyces matruchotti
    Debaryomyces tryocola
    Geotrichum loctis
    Rhodotorula glutinis
      (normal red color only)
    Saccharomyces blanchardi
    Torulopsis acetiana
    Zygosaccharomyces acidifaciens
    Zygosaccharomyces bisporus
    Zygosaccharomyces lactis
    Zygosaccharomyces japonicus
    Zygosaccharomyces variabilis
    Zygosaccharomyces versicolor
    Kloeckera bruvis
    Saccharomyces lactis The Wilson and Blair medium is made by heating to a temperature above 70° C. and at about 80° C. a mixture containing bismuth ammonium citrate, sodium sulfite, ingredients essential to growth, a solidifying agent and water. Differentiation of the species of the genus Candida cannot be made on the Wilson and Blair medium because it does not contain a bismuthyl polyhydroxy sulfite made by the reaction of bismuth nitrate and sodium sulfite in whole number molecular ratios of one to three through one to six. If bismuthyl hydroxy sulfites are prepared by reacting $Bi(NO_3)_3 \cdot 5H_2O$, nitric acid and sodium sulfite in aqueous medium above 25° C., there are less than three hydroxyl groups in the bismuthyl hydroxy sulfite molecule. Species of the genus Candida that grow on the Wilson and Blair medium produce colonies having a mottled, varicolored appearance resulting from variations in the production of bismuth sulfide by individual yeast cells of the same species.

Example V

A culture medium was prepared by adding:

| | | |
|---|---|---|
| Dextrose | g | 20.0 |
| Bismuth ammonium citrate | g | 2.0 |
| Sodium sulfite | g | 6.0 |
| Ammonium sulfate | g | 3.0 |
| $K_2HP_4$ | g | 3.0 |
| $MgSO_4 \cdot 7H_2O$ | g | 0.25 |
| $CaCl_2$ | g | 0.25 |
| Biotin | micrograms | 10.0 |
| Agar | g | 20.0 | to sufficient distilled water to make a volume of one liter and then heating to 85° to 90° C. until a white precipitate, resulting from the reaction of bismuth ammonium citrate and sodium sulfite, had formed. The homogeneous product was poured into plates, and allowed to cool.

The colors of colonies of species of the genus Candida and species of yeasts of other genera grown on the medium of Example V for 72 hours at 28° C. are given below:

The following were jet black after 72 hours:

*Candida albicans*
    *Candida guilliermondi*
    *Candida tropocalis*
    *Torulopsis pulcherrima*
    *Zygosaccharomyces priorianus*
    *Zygosaccharomyces sp.* (strain No. 223)
    *Zygosaccharomyces sp.* (strain No. 290)

The following were dark brown after 72 hours and black within 120 hours:

*Candida parakrusei*
    *Candida pelliculosa*
    *Hansenula anomala*

The following were brown or reddish brown after 72 hours:

*Candida stellatoidea*
        (black within 120 hours)
    *Debaryomyces klockeri*
    *Debaryomyces matruchotti*
    *Debaryomyces tryocola*
    *Saccharomyces cerevisiae*
    *Zygosaccharomyces acidifaciens*

The following were light brown or yellow brown after 72 hours:

*Candida krusei*
        (turns gray brown, then white)
    *Saccharomyces lactis*
    *Zygosaccharomyces sp.*
        (strain No. 216)

The following were colorless after 72 hours:

*Candida lipolytica*
    *Geotrichum lactis*
    *Rodotorula glutinis*
        (normal red color only)
    *Saccharomyces blanchardi*
    *Torulopsis lactosa*
    *Zygosaccharomyces bisporus*
    *Zygosaccharomyces lactis*
    *Zygosaccharomyces marxianus*

The following did not grow on the medium of Example V:

*Candida mortifera*
    *Cryptococcus neoformans*

It will be apparent to those skilled in the art that numerous variations, modifications, and extensions of the principles involved may be made without departing from the spirit and scope of the invention. All such variations, modificatons, and extensions are to be understood as included within the ambit of the appended claims.

What is claimed is:

1. In a culture medium for the isolation and differentiation of species of the genus Candida containing a bismuth salt, a source of nitrogen, a source of energy, a source of phosphorous, a source of essential vitamins and minerals, and a solidifying agent; the improvement comprising the bismuth salt being a bismuthyl polyhydroxy polysulfite made by the reaction of an inorganic bismuth salt and sodium sulfite in a whole number molecular ratio within the range of from 1 to 3 to 1 to 6.

2. In a culture medium for the isolation and differentiation of species of the genus Candida containing a bismuth salt, a source of assimilable nitrogen, a soluble carbohydrate, a source of essential vitamins and mineral salts, a source of phosphorous, and a solidifying agent; the improvement comprising the bismuth salt being a bismuthyl polyhydroxy polysulfite made by the reaction of an inorganic bismuth salt and sodium sulfite in a whole number molecular ratio within the range of from 1 to 3 to 1 to 6.

3. A culture medium according to claim 2 in which the source of nitrogen is a low molecular weight amino acid, the source of phosphorus, essential vitamins and essential minerals is yeast extract, and the solidifying agent is agar.

4. In a culture medium for the isolation and differentiation of species of the genus Candida containing a bismuth salt, a source of nitrogen, a source of energy, a source of phosphorous, a source of essential vitamins and minerals, and a solidifying agent; the improvement comprising the bismuth salt being a bismuthyl polyhydroxy polysulfite of the class in which the ratio of bismuth atoms to sulfur atoms is 13 to 10, 7 to 5, 15 to 10, and 8 to 5 made by the reaction of an inorganic bismuth salt and sodium sulfite in a whole number molecular ratio within the range of one to three, one to four, one to five, and one to six.

5. In a culture medium for the isolation and differentiation of species of the genus Candida containing a bismuth salt, a source of assimilable nitrogen, a soluble carbohydrate, a source of essential vitamins and mineral salts, a source of phosphorous, and a solidifying agent; the improvement comprising the bismuth salt being a bismuthyl polyhydroxy polysulfite of the class in which the ratio of bismuth atoms to sulfur atoms is 13 to 10, 7 to 5, 15 to 10, and 8 to 5 made by the reaction of an inorganic bismuth salt and sodium sulfite in a whole number molecular ratio within the range of one to three, one to four, one to five, and one to six.

6. A culture medium according to claim 5 in which the source of nitrogen is a low molecular weight amino acid, the source of phosphorus, essential vitamins and essential minerals is yeast extract, and the solidifying agent is agar.

7. In a culture medium for the isolation and differentiation of species of the genus Candida containing a bismuth salt, a source of assimilable nitrogen, a soluble carbohydrate, a source of essential vitamins and mineral salts, a source of phosphorous, and a solidifying agent; the improvement comprising the bismuth salt being bismuthyl heptahydroxy decasulfite.

8. In a culture medium for the isolation and differentiation of species of the genus Candida containing a bismuth salt, a source of assimilable nitrogen, a soluble carbohydrate, a source of essential vitamins and mineral salts, a source of phosphorous, and a solidifying agent; the improvement comprising the bismuth salt being bismuthyl trihydroxy pentasulfite.

9. In a culture medium for the isolation and differentiation of species of the genus Candida containing a bismuth salt, a source of assimilable nitrogen, a soluble carbohydrate, a source of essential vitamins and mineral salts, a source of phosphorous, and a solidifying agent; the improvement comprising the bismuth salt being made by the reaction of bismuth nitrate and sodium sulfite in a molecular ratio of 1 to 5 and having a ratio of bismuth atoms to sulfur atoms of 15 to 10.

10. In a culture medium for the isolation and differentiation of species of the genus Candida containing a bismuth salt, a source of nitrogen, a source of energy, a source of phosphorous, a source of essential vitamins and minerals, and a solidifying agent; the improvement comprising the bismuth salt being made by the reaction of bismuth nitrate and sodium sulfite in a molecular ratio of 1 to 6 and having a ratio of bismuth atoms to sulfur atoms of 8 to 5.

11. In a culture medium for the isolation and differentiation of species of the genus Candida containing a bismuth salt, glycine, a soluble carbohydrate, yeast extract, and agar; the improvement comprising the bismuth salt being a bismuthyl polyhydroxy polysulfite of the class in which the ratio of bismuth atoms to sulfur atoms is 13 to 10, 7 to 5, 15 to 10, and 8 to 5 made by the reaction of an inorganic bismuth salt and sodium sulfite in a whole number molecular ratio within the range of one to three, one to four, one to five, and one to six.

References Cited in the file of this patent

Hunter and Crecelium, Jour. Bact., 35 (1938), pp. 185–196.